United States Patent [19]

Sorrells

[11] Patent Number: 4,835,719

[45] Date of Patent: May 30, 1989

[54] METHOD FOR MONITORING PAYLOAD

[75] Inventor: Giles K. Sorrells, Dunlap, Ill.

[73] Assignee: Caterpillar Inc., Peoria, Ill.

[21] Appl. No.: 80,927

[22] Filed: Aug. 3, 1987

[51] Int. Cl.[4] ...................... G01G 19/10; G06F 15/20
[52] U.S. Cl. .................................... 364/567; 364/568;
364/570; 364/466; 364/424.01; 340/613;
177/136; 177/141
[58] Field of Search ................ 364/567, 568, 558, 424,
364/466, 570; 177/136, 141; 340/612-614

[56] References Cited

U.S. PATENT DOCUMENTS

| 4,212,074 | 7/1980 | Kuno et al. | 364/466 |
| 4,630,227 | 12/1986 | Hagenbuch | 364/567 |
| 4,635,739 | 1/1987 | Foley et al. | 177/45 |
| 4,691,792 | 9/1987 | Shintani | 177/141 |

FOREIGN PATENT DOCUMENTS

| 0162608 | 11/1985 | European Pat. Off. | |
| 2579747 | 10/1986 | France | 177/136 |
| 61-191927 | 8/1986 | Japan | 177/136 |
| 0585411 | 12/1977 | U.S.S.R. | 177/136 |
| 2043921 | 10/1980 | United Kingdom | 177/136 |

OTHER PUBLICATIONS

NTIS Technical Notes, Published Jul., 1984.
Off-Highway Haulage Truck, dated Jan., 1982, Published 3/83.

Primary Examiner—Parshotam S. Lall
Assistant Examiner—Brian M. Mattson
Attorney, Agent, or Firm—Terry D. Morgan; Robert E. Muir

[57] ABSTRACT

A payload monitoring system of a work vehicle includes a software controlled method of predicting when one additional bucketload of material will properly fill the vehicle to its rated capacity. The system calculates the actual magnitude of each bucketload of material and adds that value to the present payload to predict the future payload resulting from an additional bucketload of material. When the predicted future payload encompasses the rated capacity, the system signals the operators of both the work vehicle and the loading vehicle that one additional pass will complete the loading process.

7 Claims, 3 Drawing Sheets

METHOD FOR MONITORING PAYLOAD

DESCRIPTION

1. Technical Field

This invention relates generally to a method for indicating the magnitude of a work vehicle payload, and more particularly to a method for predicting when one additional load of material will reach the rated payload capacity of the work vehicle.

2. Background Art

In the field of off-highway trucks used, for example, in mining operations, it is desirable that the truck be loaded with a payload as close as possible to the optimum weight. Overloading the vehicle can have obvious repercussions in the expected life of critical components, as well as negative impact on fuel economy. Further, loading to less than the optimum weight seriously underutilizes the capability of the vehicle and has a negative impact upon vehicle productivity. The productivity of the entire operation is highly dependent upon the skill of the operator; however, operator skill varies widely. Accordingly, it is desirable to provide a system which aids the highly skilled and unskilled operator in accurately and consistently loading trucks with the optimum payload.

Prior systems, as disclosed in U.S. Pat. No. 4,635,739 issued Jan. 13, 1987 to D. Foley et al, have shown that strut pressure can be an accurate indicator of payload. The apparatus disclosed therein includes an electronic control which monitors each of the strut pressures, compensates for various inaccuracies introduced by load distribution and vehicle attitude, correlates this information into actual payload, and indicates to the operator when the load exceeds the desired load. However, the desired load is a function of the type of material, average bucket load of material, and the average number of bucket loads required to fill the vehicle. Therefore, variations in any of these three variables can result in serious overloading or underloading of the vehicle.

For example, a truck having a rated capacity of 180 tons loaded by a vehicle capable of 30 ton bucket loads would, on the average, require 6 bucket loads of material for an optimum load. However, if after 6 bucket loads of material only 179 tons of material has been loaded, no indication of a full load will be given. A seventh bucket load will place 209 tons on the vehicle, exceeding the rated maximum capacity. To compensate for this problem the desired payload is reduced to prevent occasional serious overloading at the expense of consistent underloading.

The present invention is directed to overcoming one or more of the problems as set forth above.

DISCLOSURE OF THE INVENTION

In accordance with an aspect of the present invention, a method is disclosed which predicts and indicates when a subsequent load added to a work vehicle having a preselected rated payload capacity will exceed a preselected percentage of the rated payload capacity of the work vehicle. The method is comprised of the following steps: calculating the present work vehicle payload; calculating a previous incremental load added to the work vehicle; adding the previous incremental load value to the present payload value to calculate a predicted subsequent payload; comparing the predicted payload to the preselected percentage of the rated payload capacity, delivering a first signal in response to the predicted payload being greater than the preselected percentage of the rated payload capacity, and delivering a second signal in response to the predicted payload being less than a preselected percentage of the rated payload capacity; and energizing one of a first and second indicator in response to receiving the first and second signal respectively.

BEST MODE FOR CARRYING OUT THE INVENTION

Figure 1:
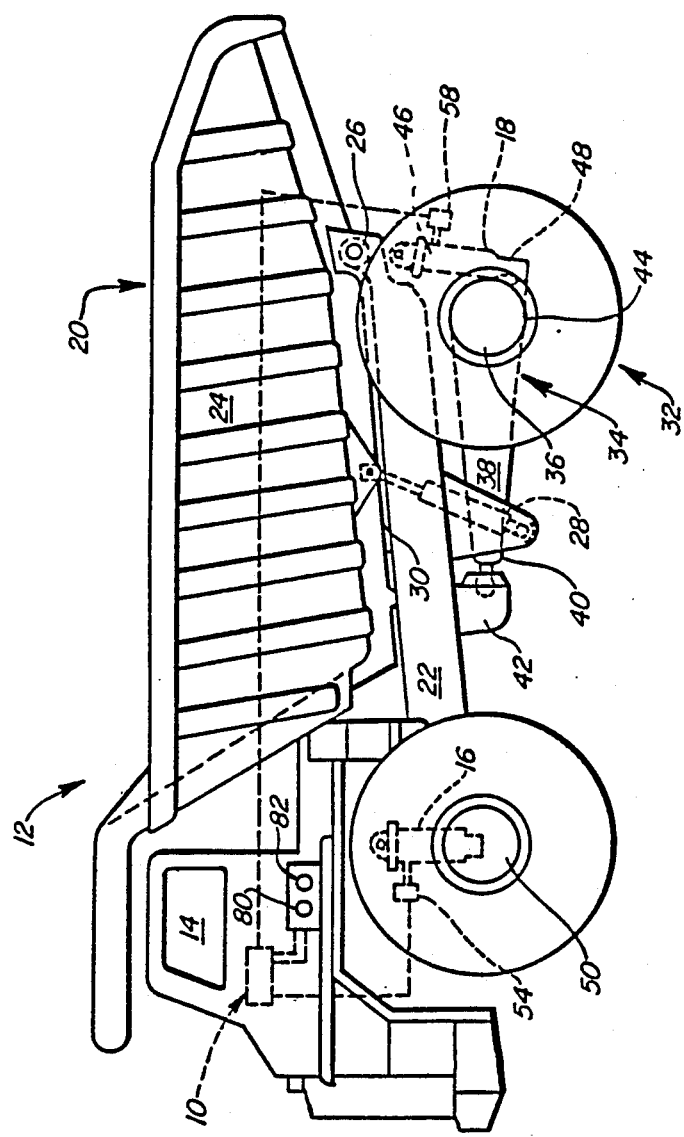
FIG. 1 is a side elevation of an off-highway truck and showing the location of various suspension components.

Referring now to the drawings, wherein a preferred embodiment of the present apparatus 10 is shown, FIG. 1 illustrates a work vehicle 12 which can be, for example, an off-highway truck 14. The truck has at least one front and rear strut 16,18 disposed in supporting relation to a load carrying portion 20 of the work vehicle 12. In the preferred embodiment the vehicle 12 has two front and two rear struts 16L,16R,18L, 18R which are the gas-over-liquid type commonly known in the industry and not described herein. It is sufficient in the understanding of the instant apparatus 10 to recognize that the pressure of the fluid is indicative of the magnitude of the load applied to the strut 16L,16R,18L,18R.

The load carrying portion 20 includes a vehicular frame 22 and dump body 24. The dump body 24 is connected to the frame 22 by pivot pin 26 and a hydraulic cylinder 28 such that the contents of the dump body 24 can be removed by controllably pressurizing the cylinder 28 to effect pivotal movement of the dump body 24 about the pivot pin 26. In the transport mode the cylinder 28 is not pressurized and the weight of the dump body is transferred to the frame 22 through the pivot pin 26 and a support pad 30 fixed to the frame 22. During normal operation in the transport mode the cylinder 28 does not carry the weight of the dump body 24.

The work vehicle 12 further includes a ground engaging portion 32 and a suspension means 34 for supporting the load carrying portion 20 in a manner to provide damped oscillatory motion between the ground engaging portion 32 and the load carrying portion 20. The suspension means 34 includes a rear axle housing 36 and an A-frame moment arm 38. The A-frame moment arm 38 has a first end portion 40 pivotally connected to the vehicular frame 22 by a socket 42 and a second end portion 44 fixedly connected to the rear axle housing 36. The first end portion 40 of the A-frame moment arm 38 is a king bolt arrangement, substantially spherical in shape and retained from lateral movement by the socket 42. The rear strut 18 has a first end portion 46 pivotally connected to the vehicular frame 22 and a second end portion 48 pivotally connected to the second end portion 44 of the A-frame moment arm 38.

During loading of the truck, as the payload increases, the load carrying portion 20 will be displaced in a direction toward the ground engaging portion 32. The rear strut 18 begins to compress while the A-frame moment arm 38 pivots about the first end portion 40. A distance L2 is defined be the distance between the first end portion 40 pivot point and the second end portion 44 pivot point of the arm 38. Therefore, it can be shown that the rear strut pressure differential is a function of the suspension means 34. Moreover, the rear strut pressure differential can be related to a reaction force R between a work surface and the ground engaging portion 32. A force S experienced by the rear strut 18 can be determined by measuring the internal pressure of the strut 18, subtracting the rear strut pressure corresponding to an unloaded truck, and multiplying the differential pressure by the area of the strut 18. The reaction force R is proportional to the payload of the vehicle 12 and can be assumed to act through the center of the rear axle housing 36 such that a summation of the moments about the pivot point of the king bolt would derive the following equation:

$$R = S*L2/L2 \qquad \text{(eqn. 1.1)}$$

where the horizontal distance between the first end portion 40 pivot point and the center of rear axle housing 36 is defined to be L3.

Similarly, the front strut 16 will be compressed as the load increases; however, the front strut is connected directly between the frame 22 and a front axle housing 50. A more straightforward relationship exists here in that a force F experienced by the front strut 16 can be determined by measuring the internal pressure of the strut 16, subtracting the front strut pressure corresponding to an unloaded truck, and multiplying the pressure by the area of the strut 16. The reaction force F between the ground engaging portion 32 and the work surface is substantially equivalent to the force F experienced by the front strut 16.

Figure 2:
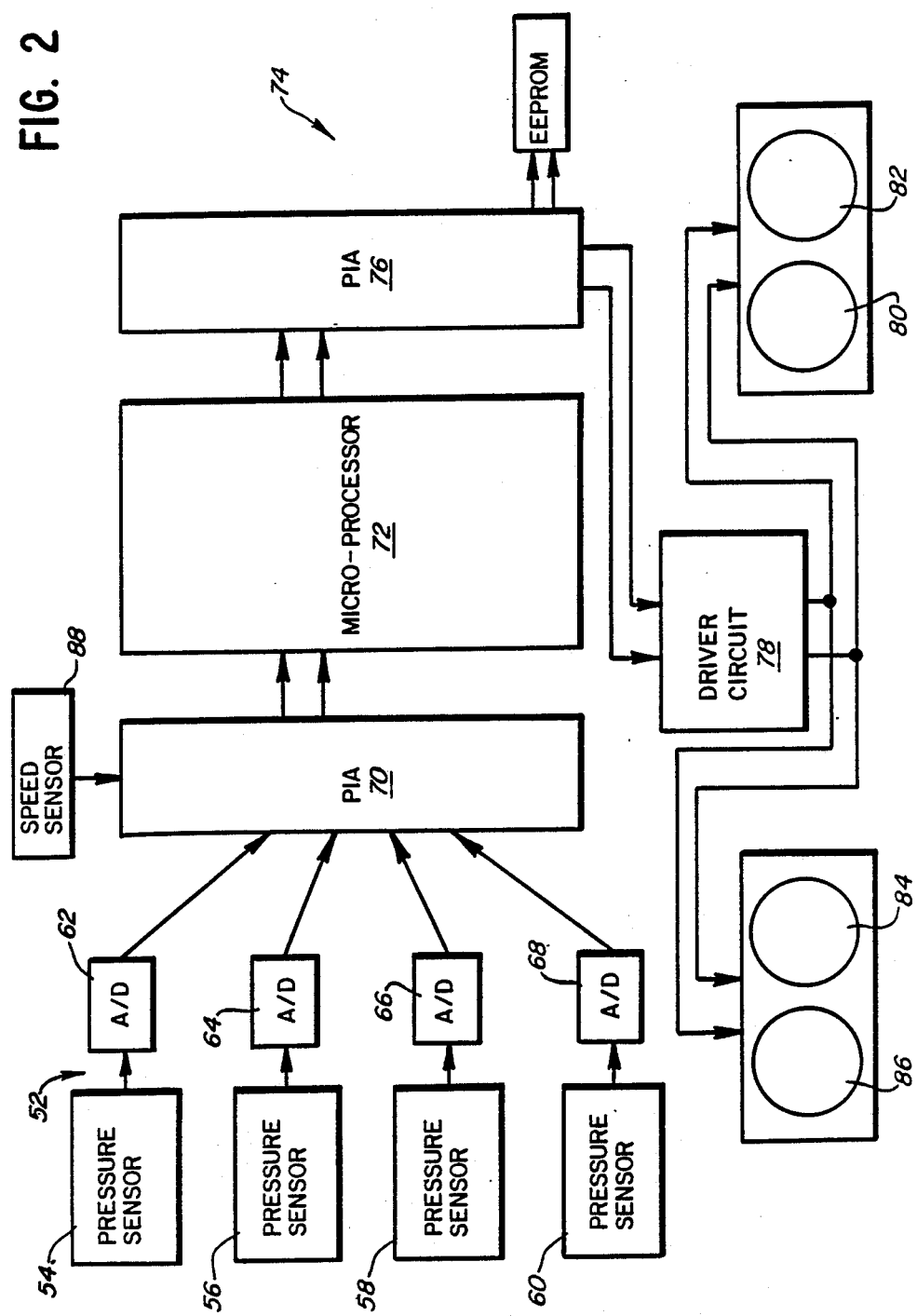
FIG. 2 is a block diagram of the payload monitor.

The apparatus 10 is shown in FIG. 1 to illustrate the relationship between the work vehicle 12 and the apparatus 10. A more detailed block diagram of the apparatus 10 is shown in FIG. 2 and diagrammatically illustrates a means 52 which periodically senses the pressures of each of the struts 16L,16R,18L,18R and delivers a plurality of signals respectively correlative to the magnitude of the internal strut pressures. The means 52 includes a plurality of pressure sensors 54,56,58,60 of the type commercially available from Dynisco as part number PT328. The pressure sensors 54,56,58,60 are respectively associated with the two front struts 16L,16R and the two rear struts 18L,18R. Each of the pressure sensors 54,56,58,60 delivers an analog signal proportional to the magnitude of the pressure of the respective strut 16L,16R,18L,18R to respective analog to digital converters (A/D) 62,64,66,68. The A/D's 62,64,66,68 are of the type commercially available from Analog Devices as part number AD5375H. However, other types of A/D converters have been contemplated by the inventor and the choice of the particular A/D disclosed herein is a matter of designer discretion. The selection of a device which provides an analog to frequency output is particularly well suited to the digital microprocessor environment disclosed herein; however, other similar devices could be easily substituted without departing from the spirit of the invention.

A Motorola programmable interface array (PIA) 70 receives the digital frequencies output by the A/D converters 62,64,66,68 and delivers these signals to a microprocessor 72 under software control. In the preferred embodiment, the microprocessor 72 is part number 6801 marketed by the Motorola Corp. The apparatus 10 also includes a means 74 which receives the control signal and delivers an indication of the magnitude of the work vehicle payload in response to the magnitude of the control signal. The indicating means 74 includes a second PIA 76 connected through a driver circuit 78 to two pair of individually energizable incandescent lamps 80,82;84,86. These lamps 80,82;84,86 are used to give indication to both the truck operator and the operator of the loading equipment of the status of the load relative to rated truck capacity. The location of one pair of the lamps 80,82 is illustrated in FIG. 1 and is shown positioned on the side of the vehicle 12 within the view of the loading equipment operator. Similarly, the second pair of lamps 84,86 is located on the opposite side of the vehicle 12 to allow loading from either position. Both pair of lamps 80,82;84,86 include one green lamp 80,84 and one red lamp 82,86. Each of the lamps 80,82,84,86 is energizable either in a continuous mode or at a preselected frequency as selected by the microprocessor 72 under software control. The combination and frequency of the energization of the lamps 80,82,84,86 has particular meaning to the loading equipment operator pertaining to the status of the payload. The particular sequences and their related meanings will be discussed in connection with the flowchart of FIG. 3.

Figure 3:
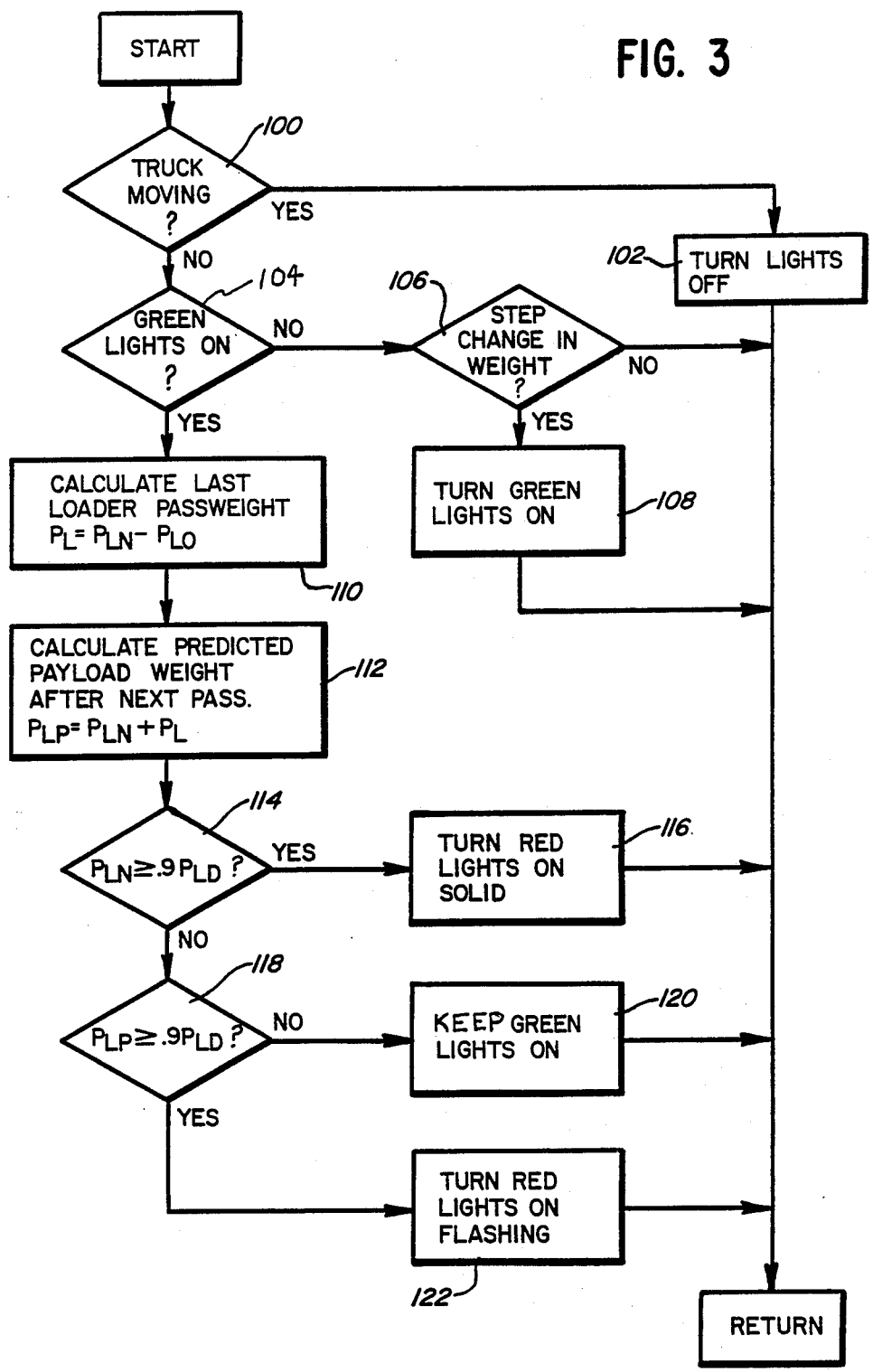
FIG. 3 is a software flowchart illustrating one embodiment for implementing the payload monitor.

Referring now to FIG. 3, a subroutine for controlling the indicator lamps 80,82,84,86 is diagrammatically illustrated via a flowchart. The software is particularly directed to predicting and indicating when a subsequent load added to the work vehicle 12 will exceed a preselected percentage of its rated payload capacity.

First, the accuracy of the payload monitor depends to a large degree on maintaining a direct relationship between the strut pressures and the payload. One factor affecting this relationship is strut pressure variations owing to road surface anomalies. More simply stated, when the vehicle is moving, the strut pressure varies according to rough road conditions as well as payload. Accordingly, to preserve the accuracy of the monitor, the loading process is allowed to proceed only if the vehicle 12 is stopped. In decision block 100 the software subroutine checks to determine if the vehicle 12 is moving by monitoring the vehicle speed sensor 88. If the vehicle 12 is moving, all of the lamps 80,82,84,86 are deenergized and control returns to the main software routine. This condition will remain unchanged until the vehicle 12 comes to a complete stop.

Subsequently, in decision block 104 the subroutine checks to determine if at least one bucket load of material has been placed on the vehicle 12. Owing to the subroutine's use of the previously added bucket load of material to predict the subsequent payload, no prediction can be made until the second bucket load of material has been added. Consequently, in decision block 104 the subroutine checks the status of the green lights 80,82 to determine if at least the first bucket load of material has been received. The green lights 80,82 are energized in response to detecting a step change in payload weight. Thus, in decision block 106, the subroutine checks for a step change in weight and returns control to the main routine without energizing the green lights 80,82 in the absence of the first bucket load of material. The present vehicle payload is periodically calculated within the main routine by sensing the internal pressure of each of the struts 16L,16R,18L,18R, delivering signals each having a magnitude correlative to the respective strut pressure, and calculating the work vehicle payload in response to the magnitude of each of the strut pressure signals according to equation 1.1. Therefore, the main routine sets a software flag when a preselected minimum change is detected in the calculated payload. In the preferred embodiment, where the apparatus is operating on a truck having a rated capacity of 180 tons the preselected minimum change is selected to be 6 tons. After the step change in weight has been detected in decision block 106, control passes to block 108 where the green lights 80,84 are energized, thereby providing a signal to the operator of the loading equipment that the apparatus 10 is operating properly.

With the green lights energized, the decision block 104 passes control to block 110 where the previous incremental load $P_L$ added to the work vehicle 12 is calculated. The previously calculated work vehicle payload $P_{LO}$ is subtracted from the present calculated work vehicle payload $P_{LN}$. The difference is necessarily the payload added by the last bucket load of material. Thereafter, the subroutine acts to predict the payload $P_{LP}$ which would result from an additional identical bucket load of material. In block 112 the value calculated for the previous incremental load $P_L$ added to the work vehicle 12 is added to the present calculated work vehicle payload $P_{LN}$ to arrive at the predicted subsequent payload $P_{LP}$.

A failsafe is included in block 114 to prevent accidental overloading of the work vehicle 12. The present calculated work vehicle payload $P_{LN}$ is compared to a preselected percentage of the rated payload capacity $P_{LD}$, a third signal is delivered in response to the present payload $P_{LN}$ being greater than the a preselected percentage of the rated payload capacity $P_{LD}$. In the preferred embodiment, the optimum load for the work vehicle 12 is 90% of the maximum. At this load, the vehicle 12 operates most efficiently. Accordingly, the apparatus 10 aids the loader operator in attempting to reach this optimum load. However, because the system does not account for all contingencies, it is possible that the desired load will be reached before the apparatus 10 has predicted. For example, during loading of the vehicle 12, each bucket load of added material fluctuates within a predictable range. Using the previous bucket load of material to predict the size of the next bucket load of material can result in a low prediction where either the previous load was undersized or the next load is oversized. Therefore, if the current payload $P_{LN}$ unexpectedly exceeds the 90% target, control transfers to block 116 where the second indicator is continuously energized in response to receiving the third signal. The red indicator light is energized continuously to indicate to the loader operator that additional loads are not required.

Conversely, the current payload will normally not exceed the target value unexpectedly and control will pass from block 114 to decision block 118. The predicted payload $P_{LP}$ is compared to a preselected percentage of the rated payload capacity $P_{LD}$, and one of a first and second signal is delivered in response to the predicted payload $P_{LP}$ being respectively greater than and less than the preselected percentage of the rated payload capacity $P_{LD}$. Once again, the targeted payload is 90% of the maximum payload, thus the preselected percentage is selected to be 90%. If the predicted payload $P_{LD}$ has not exceeded the targeted value, control transfers to block 120 where the second indicator is energized. The green light is simply maintained in an energized state indicating to the loader operator that the apparatus 10 is working and additional loads are required. On the other hand, if the predicted payload $P_{LD}$ has exceeded the targeted value, control transfers to block 122 where the first indicator is energized. To distinguish this condition from the condition indicated in block 116, the first indicator is energized at a preselected frequency in response to receiving the first signal rather than continuously energized. The flashing red light indicates to the loader operator that only one additional load of material is required. The work vehicle operator also benefits from the indication, as he may begin preparation to exit the loading area and can leave immediately after receiving the next load. Further, any work vehicle operators waiting to enter the loading area can also begin preparation to enter the area. The apparatus 10 aids in regulating the flow of traffic within the loading area to increase operational efficiency.

INDUSTRIAL APPLICABILITY

In the overall operation of the work vehicle 12, assume that the apparatus 10 is operating properly and the work vehicle 12 has stopped within the loading area. At this point neither of the indicator lamps will be energized. The loader operator will add the first bucket load of material which will initiate operation of the software to begin predicting payloads. Also the green indicator lamp will be energized to indicate proper operation.

The loader operator will continue adding bucket loads of material to the work vehicle 12 while monitoring the indicator lamps. As each bucket load of material is added, the apparatus 10 will predict the magnitude of the payload based upon the addition of an identical bucket load of material. If that predicted payload exceeds the targeted payload, the red indicator lamp flashes and the operators assume that an additional bucket load of material will complete the loading process.

Alternatively, if an unexpectedly large bucket load of material is added and exceeds the targeted payload, the apparatus 10 continuously energizes the red indicator lamp. At this point, the loading process is complete and the operators will not perform further loading cycles. The continuous red light indicates that additional material is not needed to complete the loading process.

Other aspects, objects, and advantages of this invention can be obtained from a study of the drawings, the disclosure, and the appended claims.

I claim:

1. A method for predicting and indicating when a subsequent load added to a work vehicle having a frame supported by a plurality of pressurized struts will exceed a preselected percentage of a preselected rated payload capacity of the work vehicle, the method comprising the steps of:

sensing an internal pressure of each of the struts, delivering signals each having a magnitude correlative to the respective strut pressure, and calculating a present work vehicle payload in response to the magnitude of each of the strut pressure signals;

detecting an initial increase of a preselected magnitude in the calculated present work vehicle payload and thereafter calculating a previous incremental load added to the work vehicle;

adding the calculated previous incremental load to the present work vehicle payload to calculate a predicted subsequent payload;

comparing the predicted payload to the preselected percentage of the rated payload capacity, delivering a first signal in response to the predicted payload being greater than the preselected percentage of the rated payload capacity, and delivering a second signal in response to the predicted payload being less than a preselected percentage of the rated payload capacity; and energizing one of a first and second indicator in response to receiving the first and second signal respectively.

2. A method as set forth in claim 1, wherein the step of calculating a previous incremental load added to the work vehicle includes subtracting the previously calculated present work vehicle payload from the immediate calculated present work vehicle payload.

3. A method, as set forth in claim 1, including the step of comparing the calculated present work vehicle payload and a preselected percentage of the rated payload capacity and delivering a third signal in response to the calculated present work vehicle payload being greater than the preselected percentage of the rated payload and energizing the first indicator in response to receiving the third signal.

4. A method, as set forth in claim 3, wherein the step of energizing one of a first and second indicator in response to receiving the first and second signal respectively includes energizing the first indicator at a preselected frequency in response to receiving the first signal and energizing the first indicator continuously in response to receiving the third signal.

5. A method for predicting an indicating when a subsequent incremental load added to an off-highway truck having a frame supported by a plurality of struts will exceed a preselected percentage of a preselected rated payload capacity of the truck, the method comprising the steps of:

sensing an internal pressure of each of the struts, delivering signals each having a magnitude correlative to the respective strut pressure, and calculating a present truck payload in response to the total of the magnitude of the strut pressure signals;

detecting an initial increase in the calculated present truck payload and delivering a payload signal in response to the calculated present truck payload being greater than a preselected magnitude;

detecting the payload signal and thereafter performing the following subsequent steps:

calculating the previous incremental load added to the work vehicle;

adding the calculated previous incremental load value to an existing payload value to calculate a predicted subsequent payload;

comparing the predicted payload to the preselected percentage of the rated payload capacity, delivering a first signal in response to the predicted payload being greater than the preselected percentage of the rated payload capacity, and delivering a second signal in response to the predicted payload being less than a preselected percentage of the rated payload capacity; and energizing a first indicator on the truck in response to receiving the first signal and energizing a second indicator on the truck in response to receiving the second signal.

6. A method according to claim 5, including the preliminary step of determining whether the truck is moving and performing the subsequent steps only if the truck is not moving.

7. A method according to claim 5, wherein upon detection of the payload signal the subsequent steps are performed continually while the truck is being loaded.

* * * * *